US006294781B1

(12) United States Patent
Ohkawa

(10) Patent No.: US 6,294,781 B1
(45) Date of Patent: Sep. 25, 2001

(54) ELECTROMAGNETIC MASS DISTILLER

(75) Inventor: Tihiro Ohkawa, La Jolla, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 09/298,543

(22) Filed: Apr. 23, 1999

(51) Int. Cl.[7] ............................ H01J 49/28; B01D 59/48

(52) U.S. Cl. ........................................... 250/297; 250/283

(58) Field of Search .................................... 250/297, 296, 250/283; 210/695, 748; 209/12.1

(56) References Cited

U.S. PATENT DOCUMENTS

| | | | | |
|---|---|---|---|---|
| 2,724,056 | * | 11/1955 | Slepian | 250/297 |
| 4,644,161 | * | 2/1987 | Evrard | 250/297 |
| 5,039,312 | | 8/1991 | Hollis, Jr. et al. | 55/3 |
| 5,350,454 | | 9/1994 | Ohkawa | 118/723 R |
| 5,681,434 | | 10/1997 | Eastlund | 204/156 |
| 5,868,909 | | 2/1999 | Eastlund | 204/156 |
| 6,096,220 | * | 8/2000 | Ohkawa | 210/695 |

OTHER PUBLICATIONS

Bittencourt, J.A., and Ludwig, G.O; Steady State Behavior of Rotating Plasmas in a Vacuum–Arc Centrifuge; *Plasma Physics and Controlled Fusion*, vol. 29, No. 5, pp. 601–620; Great Britain, 1987.

Bonnevier, Björn; Experimental Evidence of Element and Isotope Separation in a Rotating Plasma; *Plasma Physics*, vol. 13; pp. 763–774; Northern Ireland, 1971.

Kim, C.; Jensen, R.V.; and Krishnan, M; Equilibria of a Rigidly rotating, Fully Ionized Plasma Column; *J. Appl. Phys.*, vol. 61, No. 9; pp.4689–4690; May, 1987.

Dallaqua, R.S.; Del Bosco, E.; da Silva, R.P.; and Simpson, S.W; Langmuir Probe Measurements in a Vacuum Arc Plasma Centrifuge; *IEEE Transactions on Plasma Science*, vol. 26, No. 3, pp. 1044–1051; Jun., 1998.

Dallaqua, Renato Sérgio; Simpson, S.W. and Del Bosco, Edson; Experiments with Background Gas in a Vacuum Arc Centrifuge; *IEEE Transactions on Plasma Science*, vol. 24, No. 2; pp. 539–545; Apr., 1996.

Dallaqua, R.S.; Simpson, S.W.; and Del Bosco, E; Radial Magnetic Field in Vacuum Arc Centrifuges; *J. Phys. D.Apl.Phys.*, 30; pp. 2585–2590; UK, 1997.

Evans, P.J.; Paoloni, F. J.; Noorman, J. T. and Whichello, J. V.; Measurements of Mass Separation in a Vacuum–Arc Centrifuge; *J. Appl phys.* 6(1); pp. 115–118; Jul. 1, 1989.

(List continued on next page.)

*Primary Examiner*—Jack Berman
(74) *Attorney, Agent, or Firm*—Nydegger & Associates

(57) ABSTRACT

A device for segregating high-mass particles in a multi-species plasma from lower-mass particles has a chamber surrounded by a hollow annular shaped enclosure which defines a central axis. In a radial direction outwardly from the axis, the chamber includes a light mass collection section that is in fluid communication, through an intermediate section, with a filter section. A magnetic field, $B_z$, is oriented parallel to the central axis in the filter section, and the filter section has an outer wall which is at a distance slightly greater than a distance "a" from the central axis. An electric field is crossed with the magnetic field and is perpendicular to the central axis in the filter section. Further, there is zero potential on the outer wall of the filter section while there is a positive potential "V" on the inner wall of the filter section. At least if one plasma source injects a multi-species plasma into the filter section for interaction with the crossed magnetic and electric fields to eject high-mass particles into contact with the outer wall, while low-mass particles are prevented from doing so. High-mass particles are differentiated from low-mass particles by a predetermined value $M_c$, where $M_c = ea^2(B_z)^2/8V$.

20 Claims, 2 Drawing Sheets

OTHER PUBLICATIONS

Geva, M.; Krishnan, M; and Hirshfield, J. L. ; Element and Isotope Separation in a Vacuum–Arc Centrifuge; *J. Appl. Phys* 56(5); pp. 1398–1413; Sep. 1, 1984.

Krishnan, M.; Centrifugal Isotope Separation in Zirconium Plasmas; *Phys. Fluids* 26(9); pp. 2676–2682; Sep., 1983.

Krishnan, Mahadevan; and Prasad, Rahul R.; Parametric Analysis of Isotope Enrichment in a Vacuum–Arc Centrifuge; J. Appl. Phys. 57(11); pp. 4973–4980; Jun., 1, 1985.

Ohkawa, T., et al., Plasma Confinement in a Toroidal Quadrupole, *Physics of Fluids*, 12, p. 1926 (1969).

Ohkawa T., et al., Plasma Confinement in D.C. Octopole, *Phys Rev. Letters* 24, p. 95 (1970).

Prasad, Rahul R. and Krishnan, Mahadevan; Theoretical and Experimental Study of Rotation in a Vacuum–Arc Centrifuge; *J. Appl. Phys.*, vol. 61, No. 1; pp. 113–119; Jan. 1, 1987.

Prasad, Rahul R. and Mahadevan Krishnan; Article from *J. Appl. Phys.* 61(9); American Institute of Physics; pp. 4464–4470; May, 1987.

Qi, Niansheng and Krishnan, Mahadevan; Stable Isotope Production; p. 531.

Simpson, S.W.; Dallaqua, R.S.; and Del Bosco, E.; Acceleration Mechanism in Vacuum Arc Centrifuges; *J. Phys. D: Appl. Phys.* 29; pp. 1040–1046; UK, 1996.

Slepian, Joseph; Failure of the Ionic Centrifuge Prior to the Ionic Expander, p. 1283; Jun., 1955.

* cited by examiner

ELECTROMAGNETIC MASS DISTILLER

FIELD OF THE INVENTION

The present invention pertains generally to devices and methods for isolating and segregating charged particles of a multi-species plasma into groups according to their masses. More particularly the present invention pertains to devices and methods which combine the functional attributes of a plasma centrifuge with those of a plasma filter. The present invention is particularly, but not exclusively, useful as a device and method for segregating the charged particles of a multi-species plasma into three distinct groups, low-mass particles, intermediate-mass particles, and high-mass particles.

BACKGROUND OF THE INVENTION

Collecting charged particles, all having the same mass, from a multi-species plasma in which there are many charged particles having many different masses, involves the coordination and effective execution of several different tasks. First, of course, it is necessary to generate the multi-species plasma. This particular task can be accomplished in several ways, all of which are well known in the pertinent art. Second, once the multi-species plasma has been generated, it is then necessary to subject the multi-species plasma to physical phenomenon which will cause them to separate in a predictable manner according to their respective masses. Third, in a task that is somewhat related to the second task of separating the charged particles, all charged particles of a particular mass must be directed toward an area where they can be collected. Preferably, this is done while excluding particles of different masses which are directed elsewhere. Finally, the charged particles (ions) are collected.

In general, the physical phenomenon which are employed to separate the charged particles of a multi-species plasma from each other, involve techniques which will cause forces to be exerted on the particles. Importantly, these forces need to be proportional to the mass of the ion. One such technique involves the use of a plasma centrifuge. For example, Krishnan, M.: *Centrifugal Isotope Separation in Zirconium Plasmas; Phys. Fluids* 26 (9); pages 2676–2681; September, 1983, describes the use of centrifugal forces for the separation of charged particles (ions). Another technique which can be used to separate charged particles is disclosed in U.S. application Ser. No. 192,945, which was filed by Ohkawa on Nov. 16, 1998, for an invention entitled "Plasma Mass Filter" and which is assigned to the same assignee as the present invention. Unlike the plasma centrifuge techniques, the plasma filter disclosed by Ohkawa relies on the creation of an electromagnetic barrier which can be crossed by only particles having a mass that is greater than a predetermined value.

Heretofore, using plasma centrifuge techniques or plasma filter techniques as mentioned above, for many applications it has been possible to effectively separate high-mass particles from low-mass particles with a two-way split. There are, however, applications which can be envisioned wherein it would be desirable to achieve a more refined separation, such as with a three-way split into high-mass particles, intermediate-mass particles and low-mass particles.

In light of the above it is an object of the present invention to provide a mass segregator which is able to effectively isolate and separate a multi-species plasma into groups of high-mass particles, intermediate mass particles, and low-mass particles. It is another object of the present invention to provide a mass segregator which is able to effectively integrate the functional attributes of a plasma centrifuge with the functional attributes of a plasma mass filter to achieve effective separation of charged particles in a multi-species plasma according to their mass. Still another object of the present invention is to provide a mass segregator which can specifically isolate charged particles of a multi-species plasma that have masses greater than a predetermined value, while simultaneously separating charged particles of lesser mass from each other according to their respective masses. Yet another object of the present invention is to provide a mass segregator which is industrially easy to manufacture, relatively easy to use, and comparatively cost effective.

SUMMARY OF THE PREFERRED EMBODIMENTS

A device for segregating charged particles in a multi-species plasma includes a hollow enclosure which surrounds and defines a substantially annular shaped chamber. For purposes of spatially orienting and defining the device of the present invention, the annular shaped enclosure lies in a plane, and is radially positioned around a central axis. In particular, the central axis is substantially perpendicular to the plane of the enclosure/chamber. Further, the enclosure has a first wall and a second wall which are distanced from each other to establish the chamber therebetween. In an outward radial direction from the central axis, the chamber itself is functionally divided into a collection section for collecting light masses, an intermediate section that facilitates mass separation, and a filter section for separately collecting high and intermediate masses. For the device of the present invention, all of these sections are in fluid communication with each other.

For a preferred embodiment of the present invention, both the first wall and the second wall in the filter section of the chamber are oriented to be generally equidistant from each other and substantially parallel to the central axis and the first and second walls are also electrically biased relative to each other. Specifically, in the filter section, the first wall is at a first (largest) radial distance from the central axis and is electrically grounded. For the purposes of subsequent mathematical expressions, this outer wall in the filter chamber (i.e. first wall) has a radial distance of magnitude "a". Also, in the filter section, the second wall is located inside the first wall at a second radial distance from the central axis and is biased positively. Thus, the second radial distance is less than the outer (first) radial distance, and is some value less than "a". Somewhat like the filter section, both the first wall and the second wall in the light mass collection section of the chamber are generally equidistant from each other and are oriented substantially parallel to the central axis. In the light mass collection section, however, the second wall is farther from the central axis than is the first wall hence, reversing the sign of the electric field and avoiding the mass filtering. Specifically, in the light mass collection section the second wall of the chamber is at a third radial distance from the central axis and the first wall is at a fourth radial distance from the central axis. In this case, the third radial distance is greater than the fourth radial distance, and both have some value less than "a". Between the light mass collection section and the filter section, the intermediate section connects the light mass collection section of the chamber in fluid communication with the filter section of the chamber.

In accordance with the present invention, the first wall and the second wall in the intermediate section of said chamber are continuations of these respective walls in the filter section and the light mass collection section. Further, they are generally parallel to each other and are inclined with the central axis at an angle, $\alpha$. For one particular embodiment of the present invention, the first wall and the second wall in the intermediate section are perpendicular to the central axis, i.e. the angle $\alpha$ is equal to substantially ninety degrees ($\alpha$=90°). Thus, for this configuration, the chamber has an inverted U-shaped cross sectional configuration. It is to be appreciated, however, that the angle $\alpha$ can have other values. For instance, the angle $\alpha$ can be selected to give the chamber a doglegged configuration wherein $\alpha$ is greater than 90°.

The device of the present invention also includes a magnet for generating a magnetic field in the chamber. Preferably, the magnetic field has a magnitude $B_z$, in the filter region and is aligned between and substantially parallel to both the first wall and the second wall. Furthermore, the magnetic flux is kept constant and the magnetic field extends through the chamber from the light mass collection section, through the intermediate section and into the filter section. Thus, the magnetic field assumes the inverted U-shape configuration, the doglegged configuration, or any other configuration that happens to be established for the chamber. Importantly, however, the magnetic field in the filter section of the chamber is always oriented so as to be substantially parallel to the central axis.

In addition to the magnetic field, an electric field is established in the chamber which is substantially perpendicular to the magnetic field. Accordingly, crossed magnetic and electric fields are created in the chamber which will cause a multi-species plasma in the chamber to rotate around the central axis. Importantly, for the present invention, the electric field has a positive potential (V) on the second wall and a substantially zero potential on the first wall.

The device of the present invention also includes a source for injecting the multi-species plasma into the chamber. In the chamber, the multi-species plasma interacts with the crossed magnetic and electric fields to isolate and segregate high-mass particles from intermediate-mass particles, and to also isolate and segregate the intermediate-mass particles from low-mass particles. Functionally, this is accomplished by creating the filter section as a plasma mass filter which prevents particles having a mass less than $M_c$ from crossing a barrier where $$M_c=ea^2(B_z)^2/8V.$$

For this expression, it needs to be appreciated that the magnitude of the magnetic field will vary according to the distance from the central axis 14. $B_z$ is, therefore, taken as the magnitude of the magnetic field in the filter section 22. The magnitude of the magnetic field in the light mass collection section 26, on the other hand, will have a magnitude $B_{innerz}$ which is greater than $B_z$ by the ratio of their respective radii.

In the context of this expression, the particles in a multi-species plasma can be generally grouped into three categories. These are: low-mass particles of mass $M_1$, intermediate-mass particles of mass $M_2$, and high-mass particles of mass $M_3$. For purposes of the present invention, $M_1$ is less than $M_2$, $M_2$ is less than $M_c$, and $M_c$ is less than $M_3$ ($M_1<M_2<M_c<M_3$). Consequently, in the filter section the high-mass particles of mass $M_3$ are ejected into contact with the first wall. On the other hand, low-mass particles of mass $M_1$ and intermediate mass particles of mass $M_2$ are prevented from contacting the first wall. It is therefore the circumstance that the high-mass particles of mass $M_3$ can be collected from the first wall in the filter section of the chamber.

While the filter section of the chamber will act to establish a barrier at the radial distance “a”, where $M_c$ is calculated, that will confine and thereby prevent intermediate-mass particles and the low-mass particles in the multi-species plasma of mass $M_2$ or $M_1$ from contacting the first wall in the filter section, the remainder of the chamber can still be used to separate the intermediate-mass particles from the low-mass particles. Specifically, this is done in the chamber of the device in accordance with the well known physics of a plasma centrifuge. Accordingly, for particles of intermediate-mass $M_2$, i.e. those particles which will not pass through the barrier in the chamber at the distance “a” but which will be urged by relatively strong centrifugal forces to remain in the filter section short of the distance “a”, a collector can be provided. Due to the centrifugal forces acting on the intermediate-mass and low-mass particles in the chamber, and their resultant separation, such a collector will predominantly trap intermediate-mass particles. Another consequence of the difference in the centrifugal forces acting on the intermediate-mass and low-mass particles is that the low-mass particles will tend to be trapped in the light mass collection section.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
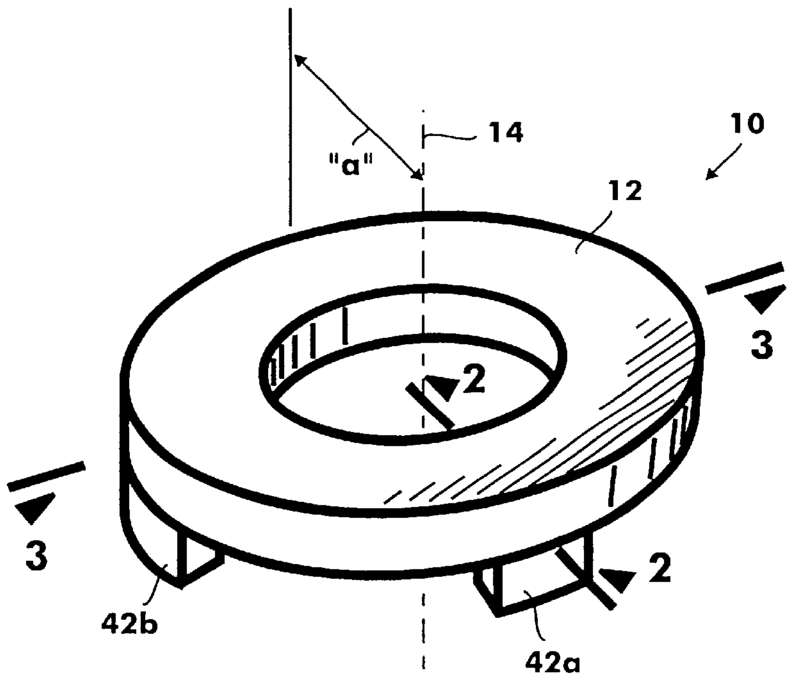
FIG. 1 is a perspective view of a device in according to the present invention.
Figure 2:
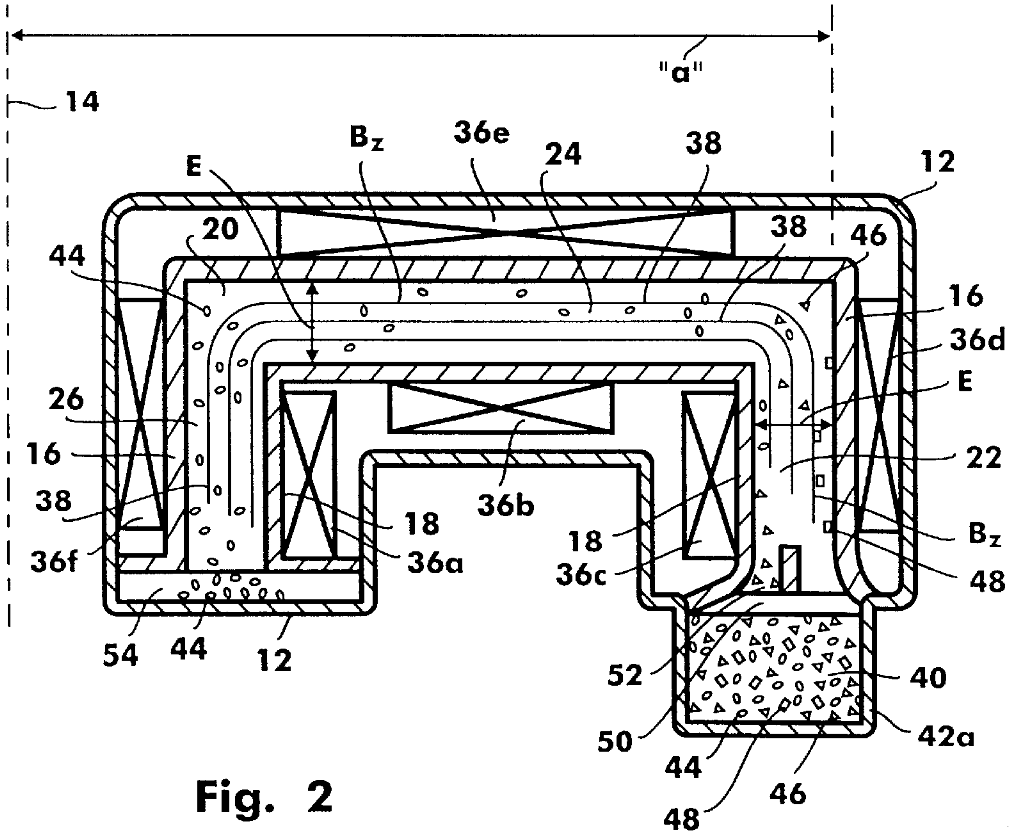
FIG. 2 is a cross sectional view of the device of the present invention as seen along the line 2—2 in FIG. 1.

Referring initially to FIG. 1, an electromagnetic device for segregating ions of a multi-species plasma according to their mass is shown and generally designated 10. As shown in FIG. 1, the enclosure 12 of the device 10 is generally annular shaped, and it lies in a plane which is substantially perpendicular to a central axis 14. Further, the enclosure 12 is centered on the central axis 14. As best seen in FIG. 2, the enclosure 12 surrounds a first wall 16 and a second wall 18 which are positioned inside the enclosure 12 and which define a chamber 20 that is located between the walls 16,18. In FIG. 2, the first wall 16 and the second wall 18 are shown to be generally equidistant from each other across the chamber 20.

Figure 3:
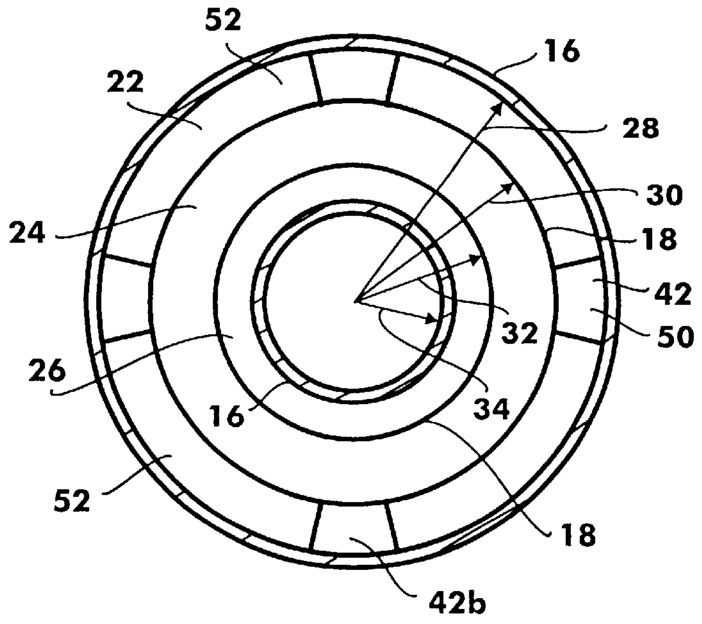
FIG. 3 is a cross sectional view of the device of the present invention as seen along the line 3—3 in FIG. 1.

Still referring to FIG. 2 it will be seen that the chamber 20 is effectively divided into three identifiable sections. These are: a filter section 22 which is located farthest from the central axis 14; an intermediate section 24; and a light mass collection section 26 which is closest to the central axis 14. Further, it will be seen in FIG. 2 that for a preferred embodiment of the present invention, the first wall 16 and the second wall 18 in the filter section 22 are substantially parallel to the central axis 14, and parallel to each other. Referring for the moment to FIG. 3, and cross referencing FIG. 3 with FIG. 2, it will be seen that in the filter section 22 the first wall 16 is at a first radial distance 28 from the central axis, and that the second wall 18 is at a second radial distance 30 from the central axis. In the intermediate section 24, however, the first wall 16 and the second wall 18 are substantially perpendicular to the central axis 14. In the light mass collection section 26 of the chamber 20, the first wall 16 and the second wall 18 are again substantially parallel to the central axis 14. In the collection section 26, however, the second wall 18 is at a third radial distance 32 from the central axis 14 while the first wall 16 is at a fourth radial distance 34 from the central axis 14. Thus, in the collection section 26, the first wall 16 is closer to the central axis 14 than is the second wall 18.

In FIG. 2 it is shown that a system of magnets, which are represented in FIG. 2 by the magnets 36*a–f*, are provided to establish a magnetic field in the chamber 20. Specifically, as indicated by the magnetic field lines 38, the magnetic field is created within the chamber 20 between the first wall 16 and the second wall 18 and is aligned so as to be substantially parallel to the first wall 16 and the second wall 18. Most importantly, this substantially parallel relationship between the field lines 38 and the first and second wall 16,18 is realized in the filter section 22. For purposes of the present invention, the magnetic field in the chamber 20 will have a substantially constant magnitude, $B_{innerz}$ which varies according to the radius. Recall, the magnitude of the magnetic field will vary according the distance from the central axis 14. $B_z$ is, therefore, taken as the magnitude of the magnetic field in the filter section 22. The magnitude of the magnetic field in the collection section 26, on the other hand, will have a magnitude $B_{innerz}$ which is greater than B, by the ratio of their respective radii. Additionally, there is an electric field, E, which is created in the chamber 20 that is substantially perpendicular to the magnetic field. More specifically, the electric field E is crossed with the magnetic field $B_{innerz}$ and is created by a positive potential V on the second wall 18 and a substantially zero potential on the first wall 16. With these crossed electric and magnetic fields, a multi-species plasma 40 is caused to move in the chamber 20 in rotation about the central axis 14. Due to the particular configuration, orientation and magnitude values of $B_z$, $B_{innerz}$ and V, charged particles in the plasma 40 will be handled differently by the device 10.

As shown in FIG. 2, the multi-species plasma 40 which is to be processed by the device 10 is generated in a plasma source 42 that is in fluid communication with the chamber 20. Further, for purposes of disclosure, consider that the plasma 40 includes charged particles (ions) which can be generally grouped into three categories. These categories are: low-mass particles 44, of mass $M_1$, intermediate mass particles 46, of mass $M_2$, and high-mass particles 48 of mass $M_3$. Further, as is more clearly set forth below, for the operation of the device 10, the calculation of a cut-off mass, $M_c$ is a key concept. Specifically, it can be shown there is a radial distance "a" from the central axis 14 beyond which charged particles having a mass less than $M_c$ can not travel in the chamber 20 of device 10. More specifically, in the filter region, the magnetic field has a magnitude "$B_z$" which is less than the magnitude of the magnetic field, $B_{innerz}$, at other locations in the chamber by the ratio of their respective radii. The positive potential on the second wall 18 at the second radial distance 30 in the filter section 22 is "V", the mass $M_c$, can be calculated according to the mathematical expression, $M_c=ea^2(B_z)^2/8V$. For the proper operation of the device 10, $M_c$ should be calculated so that $M_1$ is less than $M_2$, $M_2$ is less than $M_c$, and $M_c$ is less than $M_3(M_1<M_2<M_c<M_3)$.

In the actual operation of a device 10 in accordance with the present invention, the multi-species plasma 40 is generated in a plasma source 42. From the plasma source 42, the plasma 40 is injected into the chamber 20 through an inlet port 50. In the filter section 22 of chamber 20, the plasma 40 is acted on by the crossed magnetic ($B_z$) and electric field (E) to cause a rotation of the plasma 40 in the chamber 20 around the central axis 14. The centrifugal forces which act on the particles 44, 46 and 48 in the chamber 20 will, in a manner well known in the art, cause the low-mass particles 44, intermediate-mass particles 46 and high-mass particles 48 to separate according to their respective masses $M_1$, $M_2$ and $M_3$. Based on the calculation $M_c=ea^2(B_z)^2/8V$, and with the radial distance "a" established in the filter section 22 substantially as shown, values for $B_z$ and V can be selected which will ensure that only the high-mass particles 48 of mass $M_3$ F will travel beyond the distance "a" for contact with the first wall 16 in the filter section 22. Thus, the first wall 16 will effectively act as a collecting surface for the high-mass particles 48. Meanwhile, the low-mass particles 44 and the intermediate-mass particles 46 will be confined in the chamber 20 inside the distance "a" and subjected to centrifugal forces as in a centrifuge.

In accordance with well known physics, the movement of the low-mass particles 44 and the intermediate-mass particles along the magnetic field lines 38 (as opposed to across the lines 38) is facilitated. With the orientation of the magnetic field $B_{innerz}$ substantially parallel to both the first wall 16 and the second wall 18 in the chamber 20, this means that while the intermediate-mass particles 46 will tend to accumulate in the filter section 22, short of the radial distance "a". The low-mass particles will accumulate in the light mass collection section 26. Accordingly, a collector 52 can be provided in the filter section 22 for trapping intermediate-mass particles 46 of mass $M_2$, in regions between the plasma source 42*a* and a collector 54 can be provided in the collection section 26 for trapping low-mass particles 44 of mass $M_1$.

Figure 4:
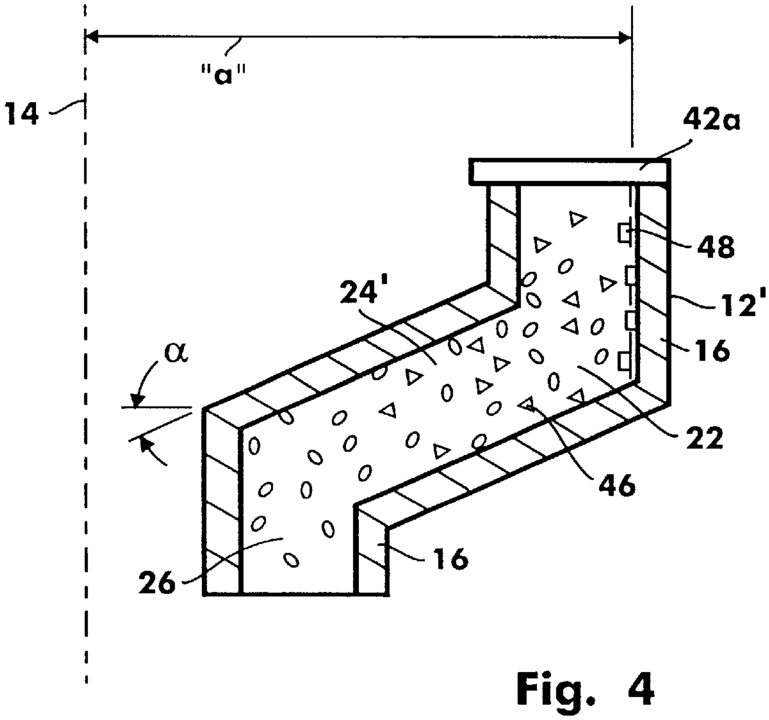
FIG. 4 is a cross sectional view of an alternate embodiment of the present invention as would be seen along the line 2—2 in FIG. 1.

For an alternate embodiment of the device 10 of the present invention, an enclosure 12' can be provided which will establish a generally doglegged configuration for the chamber 20. As shown in FIG. 4, for this alternate embodiment of the device 10, the intermediate section 24' is inclined relative to the central axis 14 by and angle α. Such a configuration will tend to take advantage of the forces of gravity for the collection and accumulation of intermediate-mass particles 46 in the filter section 22. For this configuration the plasma source 42*a* is located at the top of the filter section 22 substantially as shown in FIG. 4.

While the particular electromagnetic mass distiller as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for segregating high-mass particles in a multi-species plasma from lower-mass particles which comprises:

a hollow enclosure surrounding a substantially annular shaped chamber, said enclosure defining a plane and a central axis substantially perpendicular thereto, said enclosure having a first wall and a second wall with said second wall being distanced from said first wall to establish said chamber therebetween, said chamber having a filter section wherein said first wall and said second wall are oriented substantially parallel to said central axis, said first wall in said filter section being at a first radial distance from said central axis and said second wall being at a second radial distance from said central axis with said first radial distance being greater than said second radial a distance;

a means for generating a magnetic field in said chamber, said magnetic field being aligned between and substantially parallel to both said first wall and said second wall;

a means for generating an electric field substantially perpendicular to said magnetic field to create crossed magnetic and electric fields in said chamber, said electric field having a positive potential on said second wall and a substantially zero potential on said first wall; and a source for injecting said multi-species plasma into said chamber for interaction with said crossed magnetic and electric fields to segregate said high-mass particles by ejecting said high-mass particles into contact with said first wall to collect said high mass particles thereon, and by preventing contact of said lower-mass particles with said first wall.

2. A device as recited in claim 1 wherein said first radial distance is greater than a distance "a" from said central axis, wherein said magnetic field has a magnitude "$B_z$", wherein said positive potential on said second wall at said second radial distance is "V" and wherein said lower-mass particles have a mass less than $M_c$, and wherein said high-mass particles have a mass greater than $M_c$, where $$M_c = ea^2(B_z)^2/8V.$$

3. A device as recited in claim 2 wherein said chamber further comprises:

a collection section wherein said second wall is at a third radial distance from said central axis and said first wall is at a fourth radial distance from said central axis, said third radial distance being greater than said fourth radial distance; and an intermediate section connecting said collection section of said chamber in fluid communication with said filter section of said chamber.

4. A device as recited in claim 3 wherein said first wall and said second wall in said intermediate section of said chamber are inclined to said central axis at an angle, $\alpha$, and wherein said first wall and said second wall in said collection section of said chamber are substantially parallel to said central axis.

5. A device as recited in claim 4 wherein said angle $\alpha$ is equal to substantially ninety degrees ($\alpha=90°$).

6. A device as recited in claim 4 wherein said chamber has an inverted U-shaped cross sectional configuration.

7. A device as recited in claim 3 wherein said lower-mass particles include low-mass particles of mass $M_1$ and intermediate-mass particles of mass $M_2$, and wherein said high-mass particles include particles of mass $M_3$, where $M_1$ is less than $M_2$, $M_2$ is less than $M_c$, and $M_c$ is less than $M_3$ ($M_1<M_2<M_c<M_3$) and further wherein said filter section of said chamber includes a collector for trapping said intermediate-mass particles of mass $M_2$, while said low-mass particles of mass $M_1$ are trapped in said collection section.

8. A device as recited in claim 1 further comprising a plurality of sources for injecting said multi-species plasma into said chamber.

9. A device for segregating high-mass particles in a multi-species plasma from lower-mass particles which comprises:

a hollow annular shaped filter section defining a plane and a central axis, said filter section lying in said plane and said plane being substantially perpendicular to said central axis;

means for generating a magnetic field of magnitude "$B_z$", said magnetic field being aligned substantially parallel to said central axis in said filter section;

means for generating an electric field crossed with said magnetic field in said filter section, said electric field being oriented substantially perpendicular to said central axis in said filter section with a substantially zero potential at a first radial distance from said central axis and a positive potential of "V" at a second radial distance from said central axis, said first radial distance being greater than said second radial distance; and a source for injecting said multi-species plasma into said filter section for interaction with said crossed magnetic and electric fields to segregate said high-mass particles, having a mass greater than $M_c$, from said lower-mass particles having a mass less than $M_c$, by ejecting said high-mass particles beyond a radial distance "a," said distance "a" being less than said first radial distance and greater than said second radial distance and by confining said lower-mass particles within said distance "a", wherein $$M_c = ea^2(B_z)^2/8V.$$

10. A device as recited in claim 9 wherein said filter section comprises:

a first wall oriented substantially parallel to said central axis; and a second wall oriented substantially parallel to said central axis, said first wall in said filter section being at said first radial distance from said central axis and said second wall in said filter section being at a second radial distance from said central axis.

11. A device as recited in claim 10 further comprising:

a light mass collection section; and an intermediate section connecting said collection section in fluid communication with said filter section.

12. A device as recited in claim 11 wherein said intermediate section is inclined to said central axis at an angle, $\alpha$.

13. A device as recited in claim 12 wherein said angle $\alpha$ is equal to substantially ninety degrees ($\alpha=90°$).

14. A device as recited in claim 13 wherein said lower-mass particles include low-mass particles of mass $M_1$ and intermediate-mass particles of mass $M_2$, and wherein said high-mass particles include particles of mass $M_3$ where $M_1$ is less than $M_2$, $M_2$ is less than $M_c$, and $M_c$ is less than $M_3$ ($M_1<M_2<M_c<M_3$) and wherein said filter section includes a collector for trapping said intermediate-mass particles of mass $M_2$, while said low-mass particles of mass $M_3$ are trapped in said light mass collection section.

15. A method for segregating high-mass particles in a multi-species plasma from lower-mass particles which comprises the steps of:

providing a hollow enclosure surrounding a substantially annular shaped chamber, said enclosure defining a plane and a central axis substantially perpendicular thereto, said enclosure having a first wall and a second wall with said second wall being distanced from said first wall to establish said chamber therebetween, said chamber having a filter section wherein said first wall and said second wall are oriented substantially parallel to said central axis, said first wall in said filter section being at a first radial distance from said central axis and said second wall in said filter section being at a second radial distance from said central axis with said first radial distance being greater than said second radial distance;

generating a magnetic field in said chamber, said magnetic field being aligned between and substantially parallel to both said first wall and said second wall;

establishing an electric field substantially perpendicular to said magnetic field to create crossed magnetic and electric fields in said chamber, said electric field having a positive potential on said second wall and a substantially zero potential on said first wall; and injecting said multi-species plasma into said chamber for interaction with said crossed magnetic and electric fields to segregate said high-mass particles from said lower-mass particles by ejecting said high-mass particles into contact with said first wall in said filter section to collect said high mass particles thereon, and by preventing contact of said lower-mass particles with said first wall in said filter section.

16. A method as recited in claim 1 wherein said first radial distance is greater than a distance "a" from said central axis, wherein said magnetic field has a magnitude "$B_z$", wherein said positive potential on said second wall at said second radial distance is "V" and wherein said lower-mass particles have a mass less than $M_c$, wherein said high-mass particles have a mass greater than $M_c$, where $$M_c ea^2(B_z)^2/8V.$$

17. A method as recited in claim 16 further comprising the steps of:

creating a light mass collection section for said chamber wherein said second wall is at a third radial distance from said central axis and said first wall is at a fourth radial distance from said central axis, said third radial distance being greater than said fourth radial distance; and connecting said light mass collection section of said chamber in fluid communication with said filter section of said chamber through an intermediate section wherein said first wall and said second wall in said intermediate section of said chamber are inclined to said central axis at an angle, $\alpha$, and wherein said first wall and said second wall in said collection section of said chamber are substantially parallel to said central axis.

18. A method as recited in claim 17 wherein said angle $\alpha$ is equal to substantially ninety degrees ($\alpha$=90°).

19. A method device as recited in claim 18 wherein said chamber has an inverted U-shaped cross sectional configuration.

20. A method as recited in claim 18 wherein said lower-mass particles include low-mass particles of mass $M_1$, intermediate-mass particles of mass $M_2$, and wherein said high-mass particles include particles of mass $M_3$ where $M_1$ is less than $M_2$, $M_2$ is less than $M_c$, and $M_c$ is less than $M_3$ ($M_1<M_2<M_c<M_3$) and wherein said method further comprises the step of trapping said intermediate-mass particles of mass $M_2$ in a collector in said filter section while said low-mass particles of mass $M_3$ are trapped in said particle collection section.

* * * * *

UNITED STATES PATENT AND TRADEMARK OFFICE

CERTIFICATE OF CORRECTION

PATENT NO. : 6,294,781 B1

DATED : September 25, 2001

INVENTOR(S) : Tihiro Ohkawa

It is certified that error appears in the above-identified patent and that said Letters Patent is hereby corrected as shown below:

Column 6,
Line 17, delete "F"

Column 7,
Line 7, delete "a"

Column 9,
Line 31, delete "[$M_c ea^2(B_z)^2/8V$.]" insert -- $M_c = ea^2(B_z)^2/8V$. --

Signed and Sealed this

Fourteenth Day of May, 2002

*Attest:*

JAMES E. ROGAN

*Attesting Officer* *Director of the United States Patent and Trademark Office*